(12) United States Patent
Hata et al.

(10) Patent No.: US 7,781,045 B2
(45) Date of Patent: Aug. 24, 2010

(54) ELECTROLYTE SHEETS FOR SOLID OXIDE FUEL CELL AND METHOD FOR MANUFACTURING SAME

(75) Inventors: Kazuo Hata, Suita (JP); Norikazu Aikawa, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 1344 days.

(21) Appl. No.: 10/530,887

(22) PCT Filed: Oct. 9, 2003

(86) PCT No.: PCT/JP03/12930
§ 371 (c)(1),
(2), (4) Date: Apr. 11, 2005

(87) PCT Pub. No.: WO2004/034492
PCT Pub. Date: Apr. 22, 2004

(65) Prior Publication Data
US 2005/0271919 A1    Dec. 8, 2005

(30) Foreign Application Priority Data
Oct. 11, 2002   (JP) .............................. 2002-298574

(51) Int. Cl.
*B23B 3/26* (2006.01)
*H01M 8/12* (2006.01)
*C04B 35/64* (2006.01)

(52) U.S. Cl. .......................... 428/141; 429/45; 264/618
(58) Field of Classification Search ................. 428/141; 429/45; 264/618
See application file for complete search history.

(56) References Cited
U.S. PATENT DOCUMENTS
5,578,176 A * 11/1996 Hardee et al. .......... 204/290.08

6,178,306 B1 * 1/2001 Mizoguchi et al. .......... 399/276
6,428,920 B1 * 8/2002 Badding et al. ................ 429/30

FOREIGN PATENT DOCUMENTS
| EP | 0 857 702 A1 | 8/1998 |
| JP | 3-147268 | 6/1991 |
| JP | 9-55215 | 2/1997 |

(Continued)

OTHER PUBLICATIONS

D. Herbstritt et al., "Cathode Performance: Influence of Mod-Intermediate Layer and Electrolyte Surface Enlargement", Fourth European Solid Oxide Fuel Cell Forum, Jul. 10-14, 2000, Lucerne, Switzerland, Proceedings vol. 2, pp. 697-706.

(Continued)

*Primary Examiner*—William P Watkins, III
(74) *Attorney, Agent, or Firm*—Wenderoth, Lind & Ponack, L.L.P.

(57) ABSTRACT

The present invention provides electrolyte sheets for solid oxide fuel cells, the electrolyte sheets being able to improve their adhesion to electrode films formed on both surfaces thereof and being also able to improve electric power generation characteristics of fuel cells by an increase in their electrode reaction areas. There is disclosed an electrolyte sheet for solid oxide fuel cells including a sintered sheet, wherein surface roughness of the sheet as measured by an optical and laser-based non-contact three-dimensional profile measuring system is 2.0 to 20 µm in Rz and 0.20 to 3.0 µm in Ra, and wherein a ratio of Rz of one surface (having a greater Rz and a greater Ra) to Rz of the other surface having a smaller Rz and a smaller Ra is in a range of 1.0 to 3.0, and a ratio of Ra of one surface (having a greater Rz and a greater Ra) to Ra of the other surface having a smaller Rz and a smaller Ra is in a range of 1.0 to 3.0, and a ratio of Rmax to Rz (Rmax/Rz ratio) of at least one surface is in a range of 1.0 to 2.0.

23 Claims, 1 Drawing Sheet

FOREIGN PATENT DOCUMENTS

| | | |
|---|---|---|
| JP | 2000-281438 | 10/2000 |
| JP | 2000-351669 | 12/2000 |
| JP | 2002-42831 | 2/2002 |

OTHER PUBLICATIONS

Dirk Herbstritt et al., "Long Term Stability of SOFC with SC Doped Zirconia Electrolyte", Solid Oxide Fuel Cells VII (SOFC VII), Proceedings of the Seventh International Symposium, Proceedings vol. 2001-16, pp. 349-357, 2001.

Supplementary European Search report dated Nov. 28, 2008 for European Application No. 03754052.3 corresponding to the present US. Application.

* cited by examiner

Fig. 1

ELECTROLYTE SHEETS FOR SOLID OXIDE FUEL CELL AND METHOD FOR MANUFACTURING SAME

TECHNICAL FIELD

The present invention relates to electrolyte sheets for solid oxide fuel cells and a production process thereof, and more particularly, the present invention relates to electrolyte sheets for solid oxide fuel cells, which can improve, when electrodes are formed on both surfaces of the sheet by a screen printing technique or the like, adhesion between the electrolyte sheet and the electrodes, and which can improve electric power generation characteristics of the fuel cells by an increase in their electrode reaction areas, and which are useful for obtaining fuel cells with excellent cost performance, and a production process thereof.

BACKGROUND ART

Ceramics are utilized in many fields, because they are superior in electric and magnetic characteristics as well as mechanical properties such as heat resistance and abrasion resistance. In particular, ceramic sheets composed mainly of zirconia has excellent oxygen ion conductivity, heat resistance, corrosion resistance, rigidity, chemical resistance, and the like, so that they are widely utilized as a solid electrolyte film for sensor components such as oxygen sensors or moisture sensors, and as a solid electrolyte film for fuel cells.

The solid electrolyte films for fuel cells are required to have an enlarged contact area with electrodes for increasing an effective area of the cell reaction to improve electric power generation performance. In addition, for preventing electrode layers from peeling off the solid electrolyte films, desired are those having suitable surface unevenness on their surfaces. For these reasons, when solid electrolyte films are prepared, there have been studied surface roughing methods, for example, by blast processing of the surfaces, or by application of a coarse-grained zirconia paste and then calcining it to give a texture layer.

The present inventors have also studied surface roughness of zirconia sheets which can improve adhesion to electrode layers. As a part of the study, they have found that zirconia sheets having a maximum roughness (Ry) of 0.3 to 3 μm and an arithmetical mean roughness value (Ra) of 0.02 to 0.3 μm, as defined by JIS B-0601, exhibit excellent adhesion at the interface between the sheet surfaces and the electrode printed layers, thereby hardly causing peeling, and as a means of achieving such surface roughness, they have developed and proposed a method of controlling a particle size distribution in a slurry state (Japanese Patent Application Publication No. 2000-281438).

However, no relationship has been found between the surface roughness of electrolyte surfaces and the electric power generation performance. In other words, all that the method disclosed in this publication takes into consideration is adhesion between the electrolyte surfaces and the electrode layers against time-lapse peeling of the electrode layers from the electrolyte surfaces during the electrode reaction. The method completely fails to take into consideration the relationship between the surface roughness of electrolyte sheets and the electric power generation characteristics, and the publication contains no description of an electrolyte sheet having both acceptable adhesion to electrode printed layers and acceptable electric power generation characteristics.

Japanese Patent Application Publication No. 2000-351669 discloses a LaGaO$_3$ oxide sintered material with a specific portion recessed from a mean line of a roughness curve as defined by JIS B-0601. However, this publication does not disclose surface roughness and electric power generation performance and fails to describe an electrolyte sheet having both acceptable adhesion of electrode printed layers and acceptable electric power generation characteristics, because the invention of this publication has been developed as a technique of obtaining a compact sintered material with high density.

As a means of improving the amount of electric power generation per unit area, there has been proposed a method comprising screen printing coarse particles composed of 8 mol % of yttrium oxide-stabilized zirconia (hereinafter referred to as "8YSZ") and 10 mol % of scandium oxide-stabilized zirconia (hereinafter referred to as "10ScSZ") on a solid electrolyte green sheet to allow the coarse particles to be adhered to the surface of the solid electrolyte sheet, followed by calcining, thereby increasing a contact area with electrodes and increasing an electrode reaction area with electrode layers (Abstracts of the Fourth European SOFC Forum, p. 697, 2000, and Abstracts of the Seventh Solid Oxide Fuel Cell International Symposium (SOFC VII), p. 349, 2001).

However, these reports also fail to make mention of the relationship between the surface roughness on the surface of an electrolyte and the electric power generation performance.

Further, Japanese Patent Application Publication No. 2002-42831 discloses a release film suitable for formation of a green sheet which contributes achievement of high-power fuel cells. However, this release film can hardly be said to be satisfactory because it intends to enlarge the surface area of one surface of a solid electrolyte and the increase rate of current density is about 4% at most. Even with the use of the technique disclosed in this publication, there cannot be obtained an electrolyte sheet having both acceptable adhesion of electrode printed layers and acceptable electric power generation characteristics.

As a general surface roughening method, a blast processing method has been known, and for example, as a means of surface roughening semiconductor wafer chucks or surface roughening the underside surface of an SAW filter substrate, a blast processing method has been known. However, when the surface of a very thin solid electrolyte film having a film thickness of about 0.5 mm or smaller, particularly 200 μm or smaller, is subjected to blast processing, there arises a problem that warp, undulation, and the like may occur on the solid electrolyte film due to a stress exerted by the blast processing. In other words, in the current technical level, it is difficult to physically roughen the surface of a solid electrolyte sheet having a small film thickness.

In addition, the method in which the surface of a solid electrolyte film is subjected to blast processing, and the pretreatment method in which a coarse-grained zirconia paste is applied to the surface of a solid electrolyte, followed by calcining to thereby provide a texture layer, are not suitable for mass production and may cause an increase in cell production cost. Some improvement is therefore required.

There may exist some demand for electrolyte sheets having both acceptable adhesion of electrode printed layers and acceptable electric power generation characteristics. However, there is known no disclosure of a specific method for obtaining an electrolyte sheet meeting such demand.

The present invention has been made taking note of the above circumstance, and it is an object of the present invention to aim at an electrolyte sheet for solid oxide fuel cells, which is a compact sintered sheet having a bulk density of 97% or higher relative to the theoretical density and having a gas permeability of substantially zero, and which is subjected to electrode printing on its both surfaces, and provide en electrolyte sheet, which can improve electric power generation characteristics, which have stably excellent thermal and mechanical characteristics, and in addition, which enables strong bonding of electrode printing on its surfaces with high adhesion, and which stably exhibits excellent performance without causing a deterioration of electric power generation characteristics by peeling or the like. It is another object of the present invention to establish a technique enabling efficient production of such a high-performance electrolyte sheet by a method with high industrial mass productivity.

DISCLOSURE OF THE INVENTION

The solid electrolyte sheet according to the present invention, which can solve the above problems, comprises a sintered sheet, wherein surface roughness of the sheet as measured by an optical and laser-based non-contact three-dimensional profile measuring system is 2.0 to 20 μm in Rz and 0.20 to 3.0 μm in Ra on both surfaces of the sheet, and in addition, meets any one of the following requirements (1) to (3):

1) A ratio of Rz of one surface (having a greater Rz) to Rz of the other surface having a smaller Rz of the sheet (Rz ratio) is in a range of 1.0 to 3.0 and a ratio of Rmax to Rz (Rmax/Rz ratio) of at least one surface is in a range of 1.0 to 2.0;

2) A ratio of Ra of one surface (having a greater Ra) to Ra of the other surface having a smaller Ra of the sheet (Ra ratio) is in a range of 1.0 to 3.0 and a ratio of Rmax to Rz (Rmax/Rz ratio) of at least one surface is in a range of 1.0 to 2.0; and 3) A ratio of Rz of one surface (having a greater Rz and a greater Ra) to Rz of the other surface having a smaller Rz and a smaller Ra (Rz ratio) is in a range of 1.0 to 3.0, and a ratio of Ra of one surface (having a greater Rz and a greater Ra) to Ra of the other surface having a smaller Rz and a smaller Ra (Ra ratio) is in a range of 1.0 to 3.0, and a ratio of Rmax to Rz (Rmax/Rz ratio) of at least one surface is in a range of 1.0 to 2.0.

In the above requirements, Rz (mean roughness depth), Ra (arithmetical mean roughness value), and Rmax (maximum roughness depth) are roughness parameters as determined according to German Standard DIN-4768 and are numerical values as measured for each surface of the sheet.

In the above electrolyte sheet of the present invention, Rz and Ra are set in the respective specific ranges as described above, so that it is possible to improve electric power generation characteristics and adhesion and peeling resistance of electrodes when used for production of a cell. Further, an Ra ratio and an Rmax/Rz ratio are set in the respective specific ranges, so that it is possible to ensure excellent electrode printability and printing workability. In particular, the phrase "Rmax/Rz ratio in a range of 1.0 to 2.0" means that projections are small when seen from the cross section of the electrolyte sheet and these projections form a concave curve with uniform highest ends of the surface. This becomes important characteristics for enabling formation of an electrode having a uniform thickness without causing, for example, a thin spot during printing of the electrode.

The most preferred electrolyte comprises at least one selected from the group consisting of zirconia stabilized with 2 to 10 mol % of yttrium oxide, zirconia stabilized with 3 to 12 mol % of scandium oxide, LaGaO$_3$ oxides, and CeO$_2$ oxides.

The production process of the present invention is regarded as a process which can reliably provide an electrolyte sheet for solid oxide fuel cells principally meeting the above specific surface characteristics. The production process is featured by preparing a slurry for production of a green sheet, wherein particle size of solid components in the slurry is 0.2 to 0.8 μm in 50 vol. % diameter (hereinafter referred to as d$_{50}$) and 0.8 to 10 μm in 90 vol. % diameter (hereinafter referred to as d$_{90}$), and wherein particle size distribution has each one peak in a range of 0.2 to 0.8 μm and in a range of 0.8 to 10 μm; preparing an electrolyte green sheet by forming a sheet of the slurry on a polymer film with surface roughness being in a range of 3 to 30 μm in Rz and in a range of 0.3 to 5 μm in Ra on a surface to be coated; and calcining the electrolyte green sheet.

As a preferred method for obtaining the slurry for production of a green sheet as described above, there can be mentioned a method in which raw material powder (A) of 0.2 to 0.8 μm in d$_{50}$ and of 0.8 to 10 μm in d$_{90}$, a binder, a dispersant, and a solvent are milled to give a slurry, to which is then added raw material powder (B) of 0.2 to 2 μm in d$_{50}$ and of 0.8 to 20 μm in d$_{90}$ at a ratio of 1% to 30% by mass, based on the total raw material powder mass, and milling is further continued so that a ratio ($T_B/T_A$) of a milling time ($T_B$) after addition of the raw material powder (B) to a milling time ($T_A$) only for the raw material powder (A) is adjusted in a range of 1/100 to 1/2.

When used is a method in which an electrolyte green sheet is prepared by use of a slurry having the above particle size for production of a green sheet and then cut into a prescribed shape, and the cut green sheets are stacked up, while at least one selected from the group consisting of porous ceramic sheets, precursor green sheets of the porous ceramic sheets, and ceramic particles is placed as a spacer between the respective cut green sheets to be staked up, which are then calcined, it is possible to produce, with high productivity, a flat sheet having less warp or undulation without causing fusion bonding between the electrolyte green sheets staked up.

1, heaters; 2, alumina external cylindrical tubes; 3, alumina internal cylindrical tubes; 4, platinum lead wires; 5, solid electrolyte sheet; 6, cathode; 7, anode; and 8, sealing members

BEST MODE FOR CARRYING OUT THE INVENTION

Under the problems to be solved as described above, the present inventors have extensively studied for the conditions for production of an electrolyte sheet and the physical properties of an electrolyte sheet (in particular, surface roughness of the electrolyte sheet and electric power generation characteristics) which may vary depending on the factors of the conditions for production of an electrolyte sheet. As a result, they have found that, when the method of the present invention as will later be described in detail is employed, the definition of specific surface roughness can provide an electrolyte sheet having both acceptable adhesion of electrode layers and electric power generation characteristics, and they have further been able to define production conditions which can allow stable production of an objective product having these physical properties. As described below in detail, taking the surface roughness of an electrolyte sheet as a new index, they have succeeded in making it easy to ensure the adhesion of electrode layers and the electric power generation characteristics, as well as in establishing a simple and easy technique of production. When the production process of the present invention is employed, an objective product can be obtained more reliably. However, because the present invention makes clear an index for obtaining an objective product, an electrolyte sheet which attains the object of the present invention can also be obtained by various changes or modifications of production conditions, even besides the production process as defined in the present invention.

The present invention will specifically be described below in detail.

First, in the firm belief that surface roughness on both surfaces of an electrolyte sheet for solid oxide fuel cells has a considerable influence on adhesion of electrode printed layers and electric power generation characteristics, the present inventors have studied for surface roughness on both surfaces of the sheet. As a result, when the surface roughness of both surfaces of the sheet is adjusted so that Rz and Ra fall within specific ranges and so that an Rz ratio and an Rz ratio fall within specific ranges, and is further adjusted so that an Rmax/Rz ratio falls within a specific range, it was confirmed that an electrolyte sheet thus obtained would exhibit excellent adhesion to electrodes, as well as excellent electrode printing workability and printing stability because of a small difference in surface roughness between both surfaces. It was also confirmed that an electric power generation cell obtained by use of this electrolyte sheet would have extremely excellent electric power generation performance, even when the same electrolyte material or the same electrode material is used.

When the surfaces of the electrolyte sheet are too smooth, or more specifically, when Rz is smaller than 2.0 µm and/or when Ra is smaller than 0.20 µm, there becomes reduced an effective contact area which serves as a three-phase interface between the solid electrolyte, the electrode, and pores therein, forming an electrode reaction field. Therefore, not only electric power generation performance as a cell, i.e., the amount of electric power generation per unit area of electrode, is reduced, but also peeling can easily occur between the sheet surface and the electrode layer, when it is exposed to an elevated temperature for a long time during calcining after formation of electrodes or during use, or when it undergoes a repeated thermal history between the room temperature and the elevated temperature.

Therefore, to avoid such a problem, it is necessary to roughen the surfaces of an electrolyte sheet prior to application and formation of electrodes. However, when the surface roughness of the sheet is too large, or more specifically, Rz is greater than 20 µm and/or Ra is greater than 3.0 µm, it becomes difficult to form an electrode having a uniform thickness, which makes a contribution to the improvement of electric power generation performance. Further, not only adhesion of electrode layers is reduced, but also bending strength of an electrolyte sheet itself becomes small.

By the way, a generally employed method of forming an electrolyte sheet comprises: laying, on a polymer film having subjected to release processing, a slurry containing an electrolyte material powder, an organic binder, a dispersant, a solvent, and if necessary, a plasticizer, a defoaming agent, and the like, by a doctor blade method, a calendar method, an extrusion method, or the like, to form the slurry in sheet shape; drying the slurry sheet for evaporation of the dispersion medium to give a green sheet; and calcining the green sheet after made into an appropriate size by cutting, punching, or the like, to decompose and remove the organic binder, while making the ceramics power sintered. As to surface roughness of the green sheet thus obtained, surface roughness of the polymer film has a tendency to be transferred to the surface which was in contact with the polymer film (the surface peeled from the film), whereas roughness of the surface opened to the air during drying, which is the other surface (the air surface), has a tendency to depend on the particle size distribution of solid components in the raw material slurry.

In fact, as to surface roughness of an electrolyte sheet after calcining, surface roughness on the surface peeled from a polymer film used when an electrolyte green sheet is formed is influenced by surface roughness of the polymer film, and surface roughness on the air surface is influenced by the particle size distribution of a slurry used in the production of an electrolyte green sheet which is a precursor of the electrolyte sheet. It was confirmed that for both surfaces, the use of rough ones makes the surface roughness relatively rough, while the use of fine ones makes the surface roughness relatively fine.

Therefore, when an ordinary milled slurry and an ordinary polymer film are used, surface roughness on the surface peeled from the polymer film has a tendency to be smaller than that on the air surface by at least one order of magnitude. In the present invention, however, surface roughness on the surface peeled from the polymer film is controlled by use of a surface roughened film having specific surface roughness, and surface roughness on the air surface is adjusted by use of a slurry for production of a green sheet, in which the particle size distribution of solid components in the slurry has each one peak in specific ranges by further addition of raw material powder to an ordinary slurry obtained by milling. Thus, surface roughness on both surfaces is defined to fall within the respective ranges as described above, and the ratio of surface roughness on both surfaces is defined to fall within the specific range so that surface roughness is not largely different between one surface and the other surface.

The above term "surface roughness" used in the present invention refers to measured value according to the measurements of electric contact-type roughness parameters Ra, Rz, and Rmax as defined by Germany Standard "DIN-4768" which was revised in May, 1990. As a measuring apparatus, an optical and laser-based non-contact three-dimensional profile measuring system was used, which makes measurement in a non-contact state with respect to the surface of a sheet.

The main measurement principle of this system is as follows. A light beam of 780 nm in wavelength is emitted from a semiconductor laser optical source, and then passed through a movable objective lens to make a focal spot of 1 µm in diameter on a sample surface (i.e., the surface of an electrolyte sheet). At this time, regular reflected light is returned on the same optical path to be evenly focused on four photo diodes through a beam slitter, so that unevenness occurs in an image by displacement on the not-flat sample surface to be measured, in which a signal for eliminating this unevenness is immediately put out and high-accuracy measurement is carried out by detection of a displacement of the objective lens, with the use of a light barrier measuring mechanism, when the lens is controlled so that the focal point of the objective lens constantly meets the surface of an object to be measured. The specs are 1 µm in spot diameter and 0.01% (0.01 µm at most) of the measuring range in resolution.

In German Standard "DIN-4768", there is defined measurement of Ra, Rz, and Rmax by electric contact-type roughness parameters. The above Ra, Rz, and Rmax as defined in the present invention are those determined according to "DIN-4768" from measurement methods for Ra, Rz, and Rmax incidental to this measuring system and from arithmetic analysis programs for Ra, Rz, and Rmax.

That is, in the measurement of Rz, when Rz is in a range of greater than 0.1 µm to 0.5 µm, cutoff wavelength ($\lambda c$) is set to 0.25 mm, individual measuring section (le), to 0.25 mm, and general measuring section (lm) to 1.25 mm; when Rz is greater than 0.5 μm but smaller than 10 μm, (λc) is set to 0.8 mm, (le), to 0.8 mm, and (lm), to 4 mm; and when Rz is greater than 10 μm but smaller than 50 μm, (λc) is set to 2.5 mm, (le), to 2.5 mm, and (lm), to 12.5 mm.

Further, in the measurement of Ra, when Ra is in a range of greater than 0.1 μm to 2 μm, (λc) is set to 0.8 mm and (1m), to 4 mm; and when Rz is greater than 2 μm but smaller than 10 μm, (λc) is set to 2.5 mm and (1m), to 12.5 mm.

In general, surface roughness is evaluated by use of a contact type surface roughness measuring system in which a diamond probe or the like is brought into contact with the surface of an object to be measured, and a phase difference on the surface is converted into an electrical signal for measurement. However, such a probe has a diameter of at least 2 μm which is greater than that of the optical and laser-based measuring system, and possibly due to a catch of the probe by recesses and projections, surface roughness determined by the contact-type surface roughness measuring system is difficult to appear as a large difference in electric power generation performance. However, according to the optical and laser-based non-contact measurement method, it would be possible to grasp a surface profile or surface roughness more accurately than by use of the contact-type measuring system as described above. Thus, in the present invention, measured values of surface roughness obtained by the optical and laser-based non-contact measuring system are regarded as surface roughness of an electrolyte sheet.

When surface roughness on both surfaces of a sheet determined by the above method falls within the above ranges, electric power generation performance can be improved by an increase in electrode reaction filed (reaction effective area), so that the amount of electric power generation per electrode area can be increased. Further, an electrode having a uniform thickness can easily be formed by coating on both surfaces of an electrolyte sheet, and its adhesion at a high level can be ensured by an appropriate anchoring effect. Even during calcining of the electrode or during operation under exposure to an elevated temperature, or even when it undergoes a thermal history under repeated exposure to conditions over a range of lower temperature to higher temperature, peeling of an electrode film can be prevented as much as possible.

Taking into consideration the amount of electric power generation per unit area of the electrode, and both formability and adhesion of the electrode film, more preferred surface roughness is 3 μm or greater in Rz, more preferably in a range of 4 μm to 15 μm, and still more preferably 12 μm or smaller; and 0.4 μm or greater in Ra, more preferably in a range of 0.5 μm to 2 μm, and still more preferably 1.5 μm or smaller.

In the present invention, surface roughness on both surfaces of a sheet should meet, in addition to the above requirements as Rz and Ra, any one of the following requirements a) to c):

a) A ratio of Rz of one surface (having a greater Rz) to Rz of the other surface having a smaller Rz of the sheet (Rz ratio) is in a range of 1.0 to 3.0;

b) A ratio of Ra of one surface (having a greater Ra) to Ra of the other surface having a smaller Ra of the sheet (Ra ratio) is in a range of 1.0 to 3.0; and c) A ratio of Rz (Rz ratio) and a ratio of Ra (Ra ratio), of one surface (having a greater Rz and a greater Ra), respectively, to Rz and Ra of the other surface having a smaller Rz and a smaller Ra, are in a range of 1.0 to 3.0.

In the above, for definition of surface roughness on both surfaces of a sheet, when Rz (or Ra) of one surface is larger than Rz (or Ra) of the other surface, Ra (or Rz) of one surface is also greater than Ra (or Rz) of the other surface in ordinary cases. Accordingly, in general, surface roughness on both surfaces of a sheet is defined by a ratio of that of one surface (surface having a smaller Rz and a smaller Ra) to that of the other surface (surface having a greater Rz and a greater Ra) of the sheet. However, depending on the conditions of sheet formation, there may also be a case where Rz (or Ra) of one surface is greater than Rz (or Ra) of the other surface. Therefore, in the present invention, based on the assumption that there may be such a case, the definition was made as described above.

When the Rz ratio or the Ra ratio is over the above preferred range, a difference arises in printability because of a too large difference in surface roughness between both surfaces. Therefore, it becomes necessary to adjust the physical properties of a paste used in the printing of an electrode, the printing conditions, and the calcining conditions to each surface, which complicates the producing work of an electrode.

Further, in the electrolyte sheet of the present invention, the ratio of Rmax to Rz of a sheet surface is an important control factor. Specifically, when the Rmax/Rz ratio is 1 or greater but 2 or smaller, more preferably 1.5 or smaller, and particularly preferably 1.3 or smaller, it means that a difference between Rmax and Rz is small, and it shows that when the electrolyte sheet is viewed from the direction of cross section, the shapes of projections are relatively small and have almost the same height. Therefore, in screen printing, a plate uniformly comes into contact with the printing surface of the sheet, so that the printing of an electrode can smoothly be carried out. As a result, it becomes easy to obtain an electrode film uniform both in film thickness and in quality.

On the other hand, when the Rmax/Rz ratio is greater than 2.0, it shows that when the electrolyte sheet is viewed from direction of cross section, high projections exist in part, and therefore, unevenness on the surface is significant, and it may be because in screen printing, high projections existing on the printing surface of the sheet come into contact with the plate, which makes it difficult to become the printing of an electrode uneven, thereby causing a thin spot or the like on the electrode film, which makes it difficult to obtain an electrode film uniform both in quality and in thickness.

To more efficiently obtain an electrolyte sheet having surface roughness falling within the above range intended in the present invention, it is preferred to use, as a film used in the production of a green sheet, a polymer film having Rz of the surface to be coated in a range of 3 μm to 30 μm, more preferably in a range of 5 μm to 20 μm, and having Ra of the surface to be coated in a range of 0.3 μm to 5 μm, more preferably in a range of 0.5 μm to 3 μm. In fact, this is because when a green sheet is produced by use of a film having such surface roughness, the surface roughness of the film is transferred to the surface, peeled from the polymer film, of the green sheet.

At this time, as a preferred method of adjusting the surface roughness of a polymer film, there can be mentioned a method of coating the surface to be coated of the film with particles such as alumina, ceria, and zirconia. When such a method is used, it is possible to freely adjust the surface roughness by free selection of the particle diameter of particles to be used. For example, when surface roughening is achieved by coating with alumina particles having a mean particle size of 8 μm, Rz is about 7.9 μm and Ra about 0.9 μm, whereas when surface roughening is achieved by coating with alumina particles having a mean particle size of 20 μm, Rz is about 12.4 μm and Ra about 1.8 μm.

If the surface roughness of a polymer film to be used is greater than 30 μm in Rz and greater than 5 μm in Ra, it becomes difficult to remove a green sheet after coating from the polymer film, resulting in deteriorated workability. On the other hand, if a polymer film is used, which has an Rz of smaller than 3 μm and an Ra of smaller than 0.3 μm, the surface roughness on the surface, peeled from the polymer film, of an electrolyte sheet becomes smaller than 2.0 μm in Rz and smaller than 0.20 μm in Ra, thereby making it difficult to obtain an electrolyte sheet meeting the surface roughness intended in the present invention.

When a polymer film is used, which has been surface roughened by coating adhesion of particles as described above, the surface condition of the film is such that only the parts having the adhering particles project relative to a base plane (flat plane). Therefore, when a green sheet is formed by use of such a surface roughened film, projections on the surface of the surface roughened film are transferred in the form of recesses to the green sheet, with the result that the surface of the green sheet in contact with the surface roughened film has an infinite number of recesses relative to the base plane (flat plane). This is preferred because those having an Rmax/Rz of 1.0 or greater but 2.0 or smaller, more preferably 1.5 or smaller, and particularly preferably 1.3 or smaller, can easily be obtained.

The surface roughness of the electrolyte sheet opposite to the surface peeled from the polymer film can be adjusted in a specific range as defined in the present invention by use of, as an electrolyte material, a slurry having a particle size distribution in which particle sizes are adjusted.

This can be achieved by milling a mixture of the above electrolyte raw material powder, a binder, a dispersant, a solvent, and if necessary, a defoaming agent, a plasticizer, and the like to give a slurry for production of a green sheet, in which the particle size distribution of solid components has each one peak in a range of 0.2 to 0.8 μm and in a range of 0.8 to 10 μm; coating, with the slurry, a polymer film having surface roughness on the surface to be coated, which is 3 to 30 μm in Rz and 0.3 to 5 μm in Ra, for sheet forming to give an electrolyte green sheet; and then calcining.

To achieve this, the slurry should be prepared by milling raw material powder (A) of 0.2 to 0.8 μm in $d_{50}$ and 0.8 to 10 μm in $d_{90}$, a binder, a dispersant, and a solvent to give a slurry, to which is then added raw material powder (B) of 0.2 to 2 μm in $d_{50}$ and 0.8 to 20 μm in $d_{90}$ at a ratio of 1% to 30% by mass, based on the total raw material powder mass, and by further milling the slurry so that a ratio $(T_B/T_A)$ of a milling time $(T_B)$ after addition of the raw material powder (B) to a milling time $(T_A)$ only for the raw material powder (A) is adjusted in a range of 1/100 to 1/2. It is particularly important to adjust the solid components in the slurry before adding the raw material powder (B) to have a $d_{50}$ of 0.2 to 0.8 μm and a $d_{90}$ of 0.8 to 10 μm as defined above. The addition of rougher raw material powder (B) to raw material powder (A) makes it easy to adjust the particle size distribution of solid components in the slurry as described above.

When the particle size distribution of solid components in the slurry for production of an electrolyte green sheet has only one peak in a range of 0.2 to 0.8 μm, the surface roughness on the air surface becomes too small to ensure the surface roughness intended in the present invention. Those having only one peak in a range of 0.8 to 10 μm will result in poor compactness after calcining, and therefore, in poor sheet strength.

The raw material powder (A) and the raw material powder (B) may have the same or different composition without causing any problem. However, if the ratio of the raw material powder (B) is smaller than 1% by mass, based on the total raw material powder mass, the particle size distribution of solid components in the slurry for production of an electrolyte green sheet has only one peak in a range of 0.2 to 0.8 μm, there arises the same problem as described above. In contrast, if the ratio of the raw material powder (B) is greater than 30% by mass, based on the total raw material powder mass, the particle size distribution of solid components in the slurry for production of an electrolyte green sheet has only one peak in a range of 0.8 to 20 μm and no peak in a range of 0.2 to 0.8 μm, there arises the same problem as described above.

It is desirable that the particle size distribution of solid components in the slurry obtained by milling raw material powder (A), a binder, a dispersant, and a solvent is adjusted so that $d_{50}$ is in a range of 0.2 to 0.8 μm and $d_{90}$ is in a range of 0.8 to 10 μm. At this time, if $d_{50}$ is greater than 0.8 μm and $d_{90}$ is greater than 10 μm, a resulting electrolyte sheet may easily be short in strength.

The surface roughness of the electrolyte sheet opposite to the surface peeled from the polymer film may easily become 2 μm or smaller in Rz and 0.2 μm or smaller in Ra only by coating, with this slurry, a polymer film having the specific surface roughness as described above.

However, the later addition of raw material powder (B) having a greater $d_{50}$ and a greater $d_{90}$ than those of raw material powder (A) to the slurry having the above particle size distribution makes it possible to simply and easily adjust the surface roughness of an electrolyte sheet opposite to the surface peeled from the polymer film in the range defined in the present invention. In addition, it makes possible to provide an electrolyte sheet having a bulk density of 97% or higher, more preferably 98% or higher, relative to the theoretical density, which is compact and hardly causes a decrease in strength.

To achieve this, it is preferred that the amount of raw material powder (B) added later is at a ratio of 1% to 30% by mass, preferably 3% to 20% by mass, and more preferably 5% to 15% by mass, based on the total raw material powder mass. If the amount of raw material powder (B) added later is greater than 30% by mass, the surface roughness of an electrolyte sheet may easily be greater than 20 μm in Rz and greater than 3.0 μm in Ra, and the strength of the electrolyte sheet itself becomes deteriorated. If the amount of raw material powder (B) added later is smaller than 1% by mass, the surface roughness of an electrolyte sheet may easily be smaller than 2.0 μm in Rz and smaller than 0.20 μm in Ra.

The raw material powder (A) to be used may have a particle size distribution in which $d_{50}$ is in a range of 0.2 to 0.8 μm and $d_{90}$ is in a range of 0.8 to 10 μm; however, a more preferred particle size distribution of raw material powder (A) is in a range of 0.2 to 0.5 μm in $d_{50}$ and in a range of 1 to 2 μm in $d_{90}$.

The raw material powder (B) to be added later may be the same as the raw material powder which is milled to form a slurry, or may be of a different composition from that of the slurry, such as zirconia oxides, $LaGaO_3$ oxides, and $CeO_2$ oxides. A preferred particle size is such that $d_{50}$ is in a range of 0.2 to 2 μm and $d_{90}$ is in a range of 0.8 to 20 μm, and more preferably, such that $d_{50}$ is in a range of 0.4 to 1.0 μm and $d_{90}$ is in a range of 2 to 5 μm. There is no need to make the particle size distribution of raw material powder equal to that of raw material powder to be added later, and preferably from the viewpoint of surface roughening, the $d_{50}$ and $d_{90}$ of raw material powder to be added later are made slightly greater than those of raw material powder.

The milling time $(T_A)$ of raw material powder (A) is 1 hour or longer but 60 hours or shorter, preferably 10 hours or longer but 20 hours or shorter, and the milling time $(T_B)$ after addition of raw material powder (B) is adjusted so that the ratio of the above $T_B/T_A$ is in a range of 1/100 to 1/2, more preferably 1/10 to 1/3. Thus, a slurry for production of a green sheet is prepared in which the particle size distribution of solid components in the final slurry has each one peak in a range of 0.2 μm to 0.8 μm and in a range of 0.8 μm to 10 μm.

At this time, if $T_B/T_A$ is smaller than 1/100, for example, the dispersion of raw material powder (B) into a slurry may easily be insufficient, so that the surface roughness of a resulting electrolyte sheet is too rough and the strength of the resulting electrolyte sheet is insufficient. If $T_B/T_A$ is greater than 1/2, the dispersion of raw material powder (B) into a slurry is good, so that sufficient strength can easily be obtained; however, surface roughness may easily be insufficient. There is no particular limitation on the milling method, and there may be employed a known method using an ordinary ball mill, an ordinary beads mill, or the like.

The particle size of solid components in the above raw material powder and slurry refers to a value measured by the following method. Specifically, the particle size of raw material powder is a measured value after ultrasonic treatment for one minute to make dispersion of 0.01% to 1% by mass of raw material powder added to 100 cc of a dispersing medium, in which used as the dispersing medium is an aqueous solution obtained by addition of 0.2% by mass of sodium metaphosphate as a dispersing agent to distilled water, as determined by use of a laser diffraction particle size distribution measuring system "SALD-1100" available from Shimadzu Corp. The particle size of solid components in the slurry is a measured value after ultrasonic treatment for one minute to make dispersion of 0.01% to 1% by mass of each slurry added to 100 cc of a dispersing medium, in which used as the dispersing medium is a solvent having the same composition as that of the solvent in the slurry.

When the electrolyte sheet of the present invention is put into practical use as a solid electrolyte film of fuel cells, the sheet thickness is set to 10 μm or greater, more preferably 50 μm or greater, but 500 μm or smaller, more preferably 300 μm or smaller, for the purpose of lowering a loss of electric power distribution as small as possible, with the strength required being met.

The sheet may have any shape, such as circular, elliptical, or rectangular with round corners, and the sheet may have holes which are in shape similar to the foregoing, i.e., circular, elliptical, or rectangular with round corners. The sheet has an area of 50 cm$^2$ or greater, preferably 100 cm$^2$ or greater. The "area" means, when the sheet has holes, an area surrounded by the outer periphery, including the areas of these holes.

The kind of ceramic forming the electrolyte sheet of the present invention is not particularly limited, and preferred examples of the ceramic sintered material include zirconia oxides, LaGaO$_3$ oxides, and CeO$_2$ oxides.

Preferred examples of the zirconia oxides include solid solutions containing, as a stabilizing agent or agents, one kind, or two or more kinds, of oxides selected from the group consisting of: oxides of alkaline earth metals, such as MgO, CaO, SrO, and BaO; oxides of rare earth elements, such as Y$_2$O$_3$, La$_2$O$_3$, CeO$_2$, Pr$_2$O$_3$, Nd$_2$O$_3$, Sm$_2$O$_3$, Eu$_2$O$_3$, Gd$_2$O$_3$, Tb$_2$O$_3$, Dy$_2$O$_3$, Ho$_2$O$_3$, Er$_2$O$_3$, and Yb$_2$O$_3$; Sc$_2$O$_3$, Bi$_2$O$_3$, In$_2$O$_3$; and the like, or includes dispersion strengthened zirconia obtained by addition, to the above solid solutions, of Al$_2$O$_3$, TiO$_2$, Ta$_2$O$_5$, Nb$_2$O$_5$, and the like, as a dispersion strengthening agent.

The LaGaO$_3$ oxides are composite oxides each having a perovskite crystal structure or compositions in which parts of La and Ga are replaced by other atoms such as Sr, Y, and Mg, each having lower valency than La or Ga, to form a solid solution. Examples of the LaGaO$_3$ oxides include La$_{1-x}$Sr$_x$Ga$_{1-y}$Mg$_y$O$_3$ such as La$_{0.9}$Sr$_{0.1}$Ga$_{0.8}$Mg$_{0.2}$O$_3$, La$_{1-x}$Sr$_x$Ga$_{1-y}$Mg$_y$Co$_2$O$_3$, La$_{1-x}$Sr$_x$Ga$_{1-y}$Fe$_y$O$_3$, and La$_{1-x}$Sr$_x$Ga$_{1-y}$Ni$_y$O$_3$.

Preferred examples of the CeO$_2$ oxides include ceria oxides doped with one kind, or two or more kinds, of oxides selected from the group consisting of CaO, SrO, BaO, Ti$_2$O$_3$, Y$_2$O$_3$, La$_2$O$_3$, Pr$_2$O$_3$, Nd$_2$O$_3$, Sm$_2$O$_3$, Eu$_2$O$_3$, Gd$_2$O$_3$, Tb$_2$O$_3$, Dy$_2$O$_3$, Er$_2$O$_3$, Tm$_2$O$_3$, Yb$_2$O$_3$, PbO, WO$_3$, MoO$_3$, V$_2$O$_5$, Ta$_2$O$_5$, and Nb$_2$O$_5$.

These oxides may be used alone or, if necessary, in appropriate combination of two or more kinds thereof. In the above examples, for the purpose of obtaining an electrolyte sheet having higher thermal, mechanical, and chemical characteristics, particularly preferred are zirconium oxides each having tetragonal and/or cubic structures, which are stabilized with 2 to 10 mol % of yttrium oxide or stabilized with 3 to 12 mol % of scandium oxide.

There is no particular limitation on the kind of binder to be used in the present invention, and organic binders known heretofore can appropriately be selected and used. Examples of the organic binders include ethylene copolymers, styrene copolymers, acrylate or methacrylate copolymers, vinyl acetate copolymers, maleic acid copolymers, vinyl butyral resins, vinyl acetal resins, vinyl formal resins, vinyl alcohol resins, waxes, and celluloses such as ethyl cellulose.

In these organic binders, from the viewpoint of the formability, strength, and thermal decomposability at the time of calcining, of a green sheet, preferred are (meth)acrylate copolymers, each having a number average molecular weight of 20,000 to 200,000, more preferably 50,000 to 100,000, which are obtained by polymerization or copolymerization of at least one selected from the group consisting of alkyl acrylates, each having an alkyl group of not more than 10 carbon atoms, such as methyl acrylate, ethyl acrylate, propyl acrylate, butyl acrylate, isobutyl acrylate, cyclohexyl acrylate, and 2-ethylhexyl acrylate; alkyl methacrylates, each having an alkyl group of not more than 20 carbon atoms, such as methyl methacrylate, ethyl methacrylate, butyl methacrylate, isobutyl methacrylate, octyl methacrylate, 2-ethylhexyl methacrylate, decyl methacrylate, dodecyl methacrylate, lauryl methacrylate, and cyclohexyl methacrylate; hydroxyalkyl acrylates and hydroxyalkyl methacrylates, each having a hydroxyalkyl group, such as hydroxyethyl acrylate, hydroxypropyl acrylate, hydroxyethyl methacrylate, and hydroxypropyl methacrylate; aminoalkyl acrylates and aminoalkyl methacrylates, such as dimethylaminoethyl acrylate and dimethylaminoethyl methacrylate; carboxyl group containing monomers such as acrylic acid, methacrylic acid, maleic acid, and maleic acid half esters, e.g., monoisopropyl maleate.

These organic binders may be used alone or, if necessary, in appropriate combination of two or more kinds thereof. Particularly preferred are polymers of monomers containing 60% or more by mass of isobutyl methacrylate and/or 2-ethylhexyl methacrylate.

The ratio of raw material powder and binder to be used may preferably be in a range of 5 to 30 parts by mass, more preferably 10 to 20 parts by mass, of the latter, relative to 100 parts by mass of the former. When the amount of binder to be used is insufficient, the strength and flexibility of a green sheet become insufficient. In contrast, when the amount is too large, the viscosity adjustment in a slurry becomes difficult, and the decomposition and release of a binder component during calcining are increased and become drastic, so that it is difficult to obtain a ceramic sheet uniform in quality.

As the solvent to be used in the production of a green sheet, appropriately selected and used are water; alcohols such as methanol, ethanol, 2-propanol, 1-butanol, and 1-hexanol;

ketons such as acetone and 2-butanone; aliphatic hydrocarbons such as pentane, hexane, and butane; aromatic hydrocarbons such as benzene, toluene, xylene, and ethylbenzene; acetate esters such as methyl acetate, ethyl acetate, and butyl acetate; and the like. These solvents may be used alone or in appropriate combination of two or more kinds thereof. The amount of such a solvent to be used may preferably be adjusted in an appropriate manner, taking into consideration the viscosity of a slurry in the formation of a green sheet, and may preferably be adjusted so that the slurry viscosity falls within a range of 10 to 200 poises, more preferably in a range of 10 to 50 poises.

In the preparation of the above slurry, for the purpose of promoting the dissociation and dispersion of raw material powder, there can be added polymer electrolytes such as polyacrylic acid and ammonium polyacrylate; organic acids such as citric acid and tartaric acid; copolymers of isobutylene or styrene with maleic anhydride, and ammonium salts and amine salts thereof; dispersing agents such as copolymers of butadiene with maleic anhydride, and ammonium salts thereof; and further, phthalate esters such as dibutyl phthalate and dioctyl phthalate to provide flexibility with a green sheet; plasticizers such as glycols, e.g., propylene glycol, and glycol ethers; and the like, and further, if necessary, surfactants, defoaming agents, and the like.

The electrolyte sheet of the present invention can be obtained as follows. A slurry having the above raw material composition is formed into a sheet by various methods as described above and then dried to give an electrolyte green sheet. The green sheet is cut into a prescribed shape and size, which is then subjected to heat calcining to give an electrolyte sheet of the present invention. In this calcining step, for the purpose of obtaining an electrolyte sheet having high flatness without causing any warp or undulation, while preventing fusing bonding between the electrolyte green sheets, at least one selected from the group consisting of porous ceramic sheet having high flatness, precursor green sheets of the porous ceramic sheets, and ceramic particles is used as a spacer. Particularly preferably, the green sheet is interposed between the porous sheets each having an area greater than that of the green sheet, having a shrinkage of 5% or less by heating to a calcining temperature of the green sheet, and having a bulk density of 5% to 60%, relative to the theoretical density, in such a manner that the peripheral portion of the green sheet does not protrude from the edges of the porous sheets, and the green sheet is then calcined. Alternatively, the porous sheet is placed on the green sheet in such a manner that the peripheral portion of the green sheet does not protrude from the edge of the green sheet, and the green sheet is then calcined.

When ceramic particles are used as a spacer, an electrolyte sheet keeping the same surface roughness as the surface roughness of an electrolyte green sheet can easily be obtained, which is therefore preferred. When porous ceramic sheets or precursor green sheets thereof are used as a spacer, the tops of recesses and projections on the surface of an electrolyte sheet can easily become more uniform and flat, so that the ratio Rmax/Rz can be made much closer to 1, which is therefore preferred.

The calcining conditions are not particularly limited. However, preferred is a method in which a green sheet obtained as described above is first preheated at about 300° C. to 500° C. for about 30 to 300 minutes, so that a binder component is decomposed and burnt out, and calcining is then achieved by heating at about 1,300° C. to 1,500° C. for about 60 to 300 minutes.

EXAMPLES

The present invention will be described below more specifically by reference to examples and comparative examples; however, it should be noted that the present invention is, of course, not restricted by the following examples, but can be put into practice after appropriate changes and/or modifications in a range adapted to the purport described above and below, all of which changes and modifications are included in the technical scope of the present invention.

Example 1

Together with mixed powder of 90 parts by mass of 8YSZ powder (available from Sumitomo Osaka Cement Co., Ltd., under the trade name "OZC-8Y"; $d_{50}$, 0.4 µm and $d_{90}$, 1.8 µm) and 0.5 part by mass of high purity alumina powder (available from Taimei Chemicals Co., Ltd., under the trade name "TMDAR"), as raw material powder (A), 15 parts by mass, in terms of solid content, of a binder composed of a methacrylic copolymer (molecular weight, 30,000; and glass transition temperature, −8° C.), 1 part by mass of sorbitan trioleate as a dispersant, 2 parts by mass of dibutyl phthalate as a plasticizer, and 50 parts by mass of a mixed solvent of toluene/isopropanol (mass ratio=3/2) as a solvent were put into a nylon pot charged with zirconia balls, and milling was continued for 35 hours to give a slurry.

To this slurry was added 10 parts by mass of powder ($d_{50}$, 1.6 µm and $d_{90}$, 7.3 µm) obtained by provisionally calcining the same YSZ powder as described above at 1100° C. for 3 hours as raw material powder (B), and milling was further continued for 5 hours to give a slurry for formation of an electrolyte sheet.

Part of this slurry was collected and diluted with a mixed solvent of toluene and isopropanol (mass ratio, 3/2), followed by measurement of the particle size distribution of solid components in the slurry using a particle size distribution measuring apparatus "SALD-1100" available from Shimadzu Corp. The particle size distribution of solid components in the slurry had a $d_{50}$ of 0.6 µm and a $d_{90}$ of 2.8 µm, and had a major peak at 0.5 µm and a minor peak at 6.9 µm.

This slurry was adjusted to have a viscosity of 30 poises (23° C.) by concentration and defoaming, and finally passed through a filter of 200 meshes, followed by coating therewith a polyethylene terephthalate (PET) film having a roughened surface by a doctor blade method, to give a solid electrolyte green sheet. The surface roughness on the surface to be coated of the surface roughened PET film used was 7.9 µm in Rz and 0.9 µm by Ra.

This green sheet was cut into a square, which was removed from the PET film and then interposed between 99.5% alumina porous sheets (porosity, 30%) having a maximum roughness height of 10 µm and degreased, followed by heat calcining at 1,450° C. for 3 hours, to give a 8YSZ electrolyte sheet, which was a square, about 40 mm on a side, and 0.3 mm thick. The conditions for preparation of the sheet are shown in Table 1.

The surface which had been in contact with the PET film, and the opposite surface which had been exposed to air (the air surface), of the sheet obtained were measured for Rz, Ra, and Rmax, using an optical and laser-based non-contact three-dimensional profile measuring system, Micro Focus Expert "UBC-14 system", available from UBM Corp.

The electrolyte sheet was further measured for bulk density by the Archimedes method and then cut into a strip of 4 mm×40 mm using a diamond cutter to give a test piece, followed by measurement of a three-point bending strength according to JIS R-1601. The results are shown in Table 2.

Example 2

An 8YSZ electrolyte sheet, which was a square, about 40 mm on a side, and 0.3 mm thick, was prepared in completely the same manner as described above in Example 1, except that a surface roughened PET film with the surface roughness on the surface to be coated being 12.4 μm in Rz and 1.8 μm in Ra was used.

Example 3

An electrolyte sheet, which was a square, about 40 mm on a side, and 0.3 mm thick, was prepared in the same manner as described above in Example 1, except that the same 8YSZ powder as the raw material powder (A) was used as the raw material powder (B) and milling was continued for 40 minutes after addition of the raw material powder (B).

Example 4

An electrolyte sheet, which was a square, about 40 mm on a side, and 0.3 mm thick, was prepared in the same manner as described above in Example 1, except that 3YSZ powder (available from Sumitomo Osaka Cement Co., Ltd., under the trade name "OZC-3Y"; $d_{50}$, 0.5 μm and $d_{90}$, 2.1 μm) was used as the raw material powder (B).

Example 5

A 10Sc1CeSZ electrolyte sheet, which was a square, about 40 mm on a side, and 0.5 mm thick, was prepared in the same manner as described above in Example 1, except that mixed powder of 90 parts by mass of zirconia powder stabilized with 10 mol % scandium oxide and 1 mol % cerium oxide (available from Daiichi Kigenso Kagaku Kogyo Co., Ltd., under the trade name "10Sc1CeSZ"; $d_{50}$, 0.6 μm and $d_{90}$, 2.4 μm) and 0.3 part by mass of high purity alumina powder (available from Taimei Chemicals Co., Ltd., under the trade name "TMDAR") was used as the raw material powder (A), and powder having a $d_{50}$ of 0.9 μm and a $d_{90}$ of 5.4 μm, which had been obtained by provisionally calcining the same 10Sc1CeSZ powder as described above at 1,000° C. for 2 hours, was used as the raw material powder (B), and calcining was carried out at 1,400° C.

Example 6

A LaGaO₃ electrolyte sheet, which was a square, about 40 mm on a side, and 0.5 mm thick, was prepared in the same manner as described above in Example 1, except that $La_{0.9}Sr_{0.1}Ga_{0.8}Mg_{0.2}O_3$ (high temperature type) powder (available from Seimi Chemical Co., Ltd.; $d_{50}$, 0.6 μm and $d_{90}$, 4.3 μm) was used as the raw material powder (B) of LaGaO₃ oxide, and milled powder obtained by wet milling the same powder as used for the raw material powder (B) to have a $d_{50}$ of 0.5 μm and a $d_{90}$ of 1.9 μm was used as the raw material powder (A), and the green sheet was placed on a magnesia setter and calcined at 1,500° C.

Example 7

A CeO₂ electrolyte sheet, which was a square, about 40 mm on a side, and 0.5 mm thick, was prepared in the same manner as described above in Example 1, except that samarium oxide doped $(CeO_2)_{0.8}(SmO_{1.5})_{0.2}$ (available from Seimi Chemical Co., Ltd.; $d_{50}$, 0.8 μm and $d_{90}$, 5.7 μm) was used as the raw material powder (B) of CeO₂ oxide, and milled powder obtained by wet milling the same powder as used for the raw material powder (B) to have a $d_{50}$ of 0.5 μm and a $d_{90}$ of 1.8 μm was used as the raw material powder (A).

Comparative Example 1

A green sheet was prepared using a slurry, which had been obtained by using, as the raw material powder (A), the same 8YSZ powder as used in Example 1, using no raw material powder (B), and milling for 40 hours, and an ordinary PET film with the surface roughness on the surface to be coated, which had not been roughened, being 0.38 μm in Rz and 0.17 μm in Ra, and the green sheet was cut into a prescribed size. An 8YSZ electrolyte sheet, which was a square, about 40 mm on a side, and 0.3 mm thick, was prepared in the same manner as described above in Example 1, except that the cut green sheet was interposed between the surfaces to be coated of the same PET films as used for coating and then subjected to heat press (60° C.×10 minutes).

Comparative Example 2

An electrolyte green sheet was prepared in the same manner as described above in Example 1, except that a surface-roughened PET film (the surface roughness on the surface to be coated is 31 μm in Rz and 5.4 μm in Ra). When this green sheet was to be removed from the PET film for calcining, the green sheet was not able to be removed smoothly, and cracks occurred on the green sheet.

Comparative Example 3

An electrolyte sheet with surface roughness on the air surface being 24.2 μm in Rz and 5.3 μm in Ra, and surface roughness on the surface peeled from the polymer film being 21.7 μm in Rz and 3.8 μm in Ra was obtained by subjecting both surfaces of the 8YSZ electrolyte sheet obtained in Example 1 to blast processing with a blaster apparatus (available from Shinto Brator Ltd., Micro Blaster, model MB-1). The air surface first subjected to blast processing had a comparably large warp, which was somewhat reduced by blast processing of the opposite PET surface; however, a warp was still observed.

Comparative Example 4

An 8YSZ electrolyte sheet, which was a square, about 40 mm on a side, and 0.3 mm thick, was prepared in the same manner as described in Example 1, except that powder having a $d_{50}$ of 4.3 μm and a $d_{90}$ of 25.7 μm obtained by provisionally calcining 8YSZ powder, which was the same raw material powder (A) as used in Example 3 above, at 1,250° C. for 3 hours was used as the raw material powder (B), and the same PET film, of which surface to be coated had not been roughened, as used in Comparative Example 1 above, was coated with a slurry obtained by milling for 20 minutes after addition of the raw material powder (B).

Comparative Example 5

An 8YSZ electrolyte sheet, which was a square, about 40 mm on a side, and 0.3 mm thick, was prepared in the same manner as described above in Example 1, except that the same 8YSZ powder provisionally calcined at 1,250° C. as used in Comparative Example 4 above was used as the raw material powder (A); the same 8YSZ powder as used in Example 3 above was used as the raw material powder (B); the raw material powder (A) and the raw material powder (B) were mixed at a ratio of 60 parts by mass and 40 parts by mass; the milling time for the raw material powder (A) was 5 hours; the milling time after addition of the raw material powder (B) was 35 hours; and the same surface-roughened PET film as used in Example 2 above was used.

Comparative Examples 6 to 8

8YSZ electrolyte sheets, each of which was a square, about 40 mm on a side, and about 0.5 mm thick, were prepared by using the same raw material powders (A) and (B) as used in Examples 5, 6, and 7, coating the same ordinary PET films, each of which surface to be coated had not been roughened, as used in Comparative Example 1 above, and subjecting resulting green sheets to heat press.

Cell Production Example 1

To the more roughened surface of each of the 8YSZ electrolyte sheets obtained in Examples 1 to 4 above, Comparative Examples 1 and 3 to 5 above, an anode paste composed of 70 parts by mass of nickel oxide powder ($d_{50}$, 0.9 μm and $d_{90}$, 3.1 μm) obtained by heat decomposition of basic nickel carbonate and 30 parts by mass of the same 8YSZ powder as used in Example 1 as the raw material powder (A) was applied by screen printing, and after drying, calcined by heating at 1,300° C. for 1 hour to give an anode electrode layer having a thickness of about 50 μm.

Then, to the other surface, a cathode paste composed of 95 parts by mass of strontium doped manganite ($La_{0.8}Sr_{0.2}MgO_3$) powder (available from Seimi Chemical Co., Ltd.; $d_{50}$, 1.3 μm and $d_{90}$, 3.5 μm) and 5 parts by mass of 8YSZ powder was applied by screen printing, and after drying, calcined by heating at 1,100° C. for 1 hour to give a cathode electrode layer having a thickness of about 30 μm. Thus obtained was a cell in a three-layered structure having electrodes formed on both surfaces of the 8YSZ electrolyte sheet.

The electrolyte sheet obtained in Comparative Example 3 had a warp, so that it was not able to form any uniform electrode layer in the screen printing.

Cell Production Example 2

To the more roughened surface of each of the 10Sc1CeSZ electrolyte sheets obtained in Examples 5 and Comparative Examples 6 above, an anode paste composed of 70 parts by mass of the same nickel oxide powder as used in Cell Production Example 1 above and 30 parts by mass of the same 10Sc1CeSZ powder as used in Example 5 as the raw material powder (A) was applied by screen printing, and after drying, calcined by heating at 1,300° C. for 1 hour to give an anode electrode layer having a thickness of about 50 μm.

Then, to the other surface, the same cathode paste as used in Cell Production Example 1 above was applied by screen printing, and after drying, calcined at 1,100° C. for 1 hour. Thus obtained was a cell in a three-layered structure having electrodes formed on both surfaces of the 10Sc1CeSZ electrolyte sheet.

Cell Production Example 3

To the more roughened surface of each of the lanthanum gallate electrolyte sheets obtained in Examples 6 and Comparative Examples 7 above, the same anode paste as used in Cell Production Example 2 above was applied by screen printing, and after drying, calcined by heating at 1,300° C. for 1 hour to give an anode electrode layer having a thickness of about 50 μm.

Then, to the other surface, a cathode paste composed of strontium doped lanthanum iron cobaltate ($La_{0.6}Sr_{0.4}Fe_{0.8}Co_{0.2}O_3$) powder (available from Seimi Chemical Co., Ltd.; $d_{50}$, 1.7 μm and $d_{90}$, 4.1 μm) was applied by screen printing, and after drying, calcined by heating at 1,100° C. for 1 hour to give a cathode electrode layer having a thickness of about 30 μm. Thus obtained was a cell in a three-layered structure having electrodes formed on both surfaces of the lanthanum gallate electrolyte sheet.

Cell Production Example 4

To the more roughened surface of each of the ceria electrolyte sheets obtained in Examples 7 and Comparative Examples 8 above, the same anode paste as used in Cell Production Example 3 was applied by screen printing, and after drying, calcined by heating at 1,300° C. for 1 hour to give an anode electrode layer having a thickness of about 50 μm.

Then, to the other surface, the same cathode paste as obtained in Cell Production Example 3 was applied by screen printing, and after drying, calcined by heating at 1,100° C. for 1 hour to give a cathode electrode layer having a thickness of about 30 μm. Thus obtained was a cell in a three-layered structure having electrodes formed on both surfaces of the ceria electrolyte sheet.

[Performance Evaluation Tests]

Figure 1:
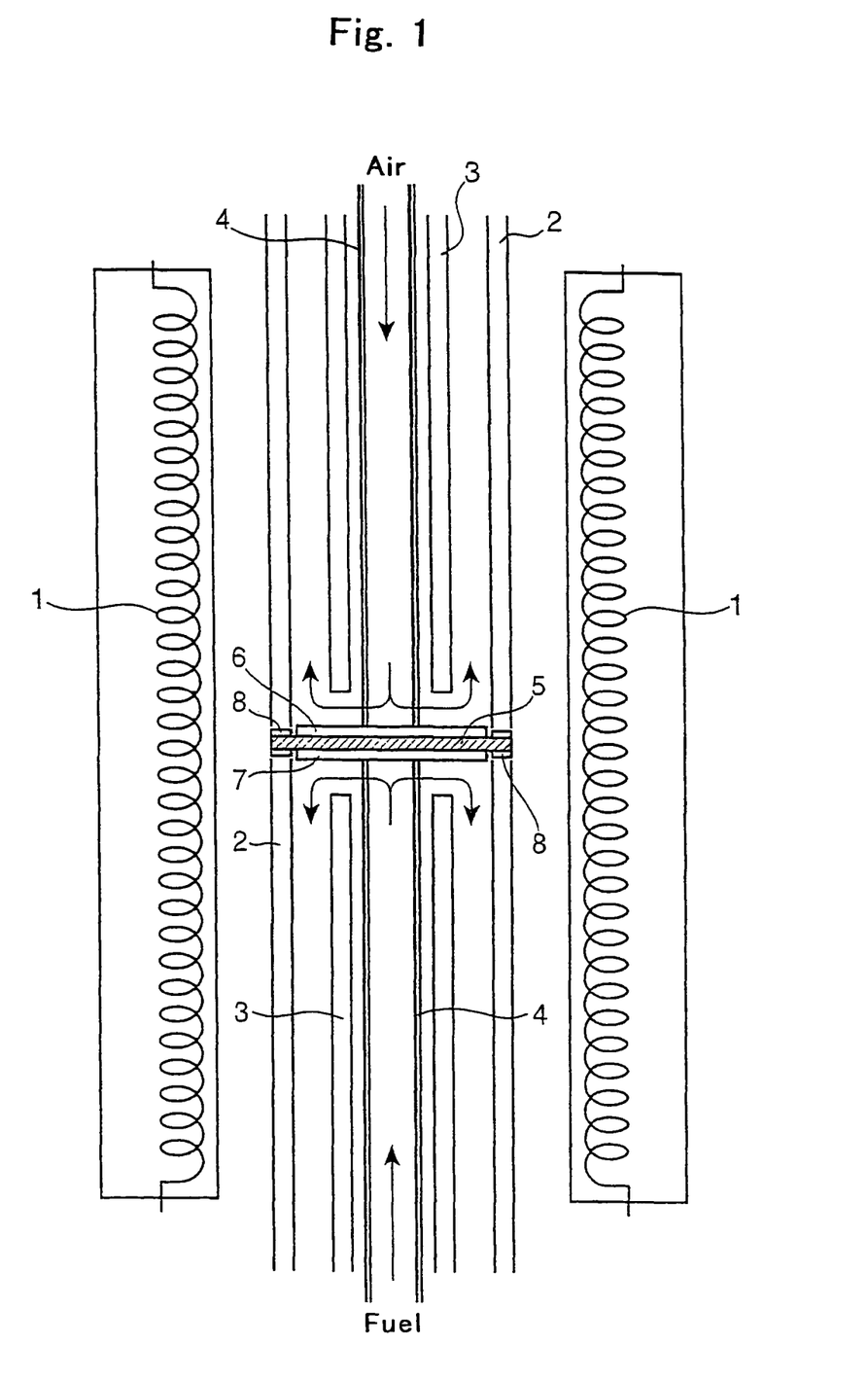
FIG. 1 is a schematic view showing an apparatus for evaluation of electric power generation with a single cell used in experiments.

Current (I) and voltage (V) were measured at 950° C. for the cell obtained in Cell Production Example 1 above or at 800° C. for the cells obtained in Cell Production Examples 2 to 4 using an apparatus for evaluation of electric power generation with a single cell as shown in FIG. 1 (in the figure, 1 indicates a heater; 2, an alumina outer cylindrical tube; 3, an alumina inner cylindrical tube; 4, a platinum lead wire; 5, a solid electrolyte sheet; 6, a cathode; 7, an anode; and 8, a sealing member), and the results of electric power generation performance were summarized as the maximum output density ($W/cm^2$) at 950° C. or 800° C. in Table 3.

As a current measuring apparatus was used one available from Advantest Corp., under the trade name "TR6845", and as a current-voltage generator was used one available from Takasago Ltd., under the trade name "GP016-20R". The electrodes had an area of 7 $cm^2$. To the anode side was fed 3% moisturized hydrogen gas as a fuel gas at one liter/min., and to the cathode side was fed air as an oxidant at one liter/min.

Further, under these conditions, electric power generation test was continuously carried out, and after the lapse of 200 hours, each cell was evaluated for I-V characteristics, and the maximum output density ($W/cm^2$) was determined in the same manner as described above. The results are shown in Table 3.

Table 3 shows an increased ratio of the maximum output density of each cell: Cell Production Example 1 to Comparative Example 1, Cell Production Example 2 to Comparative Example 6, Cell Production Example 3 to Comparative Example 7, and Cell Production Example 4 to Comparative Example 8.

TABLE 1

| Symbol | Composition (A)/(B) | Particle size of raw material powder (μm) | | | | Raw material powder ratio parts by mass (A)/(B) | Milling time (h) | | | Slurry particle size (μm) | | PET surface roughness (Surface to be coated) | | Film peel-ability |
|---|---|---|---|---|---|---|---|---|---|---|---|---|---|---|
| | | Raw material powder (A) | | Raw material powder (B) | | | Before mixing $T_A$ | After mixing $T_B$ | Milling time ratio $T_B/T_A$ | | | | | |
| | | $d_{50}$ | $d_{90}$ | $d_{50}$ | $d_{90}$ | | | | | $d_{50}$ | $d_{90}$ | Rz | Ra | |
| Ex. 1 | 8YSZ/8YSZ (provisionally calcined at 1,000° C.) and 0.5 part by mass of alumina | 0.4 | 1.8 | 1.6 | 7.3 | 90/10 | 35 | 5 | 1/7 | 0.6 | 2.8 | 7.9 | 0.9 | ○ |
| Ex. 2 | 8YSZ/8YSZ (provisionally calcined at 1,000° C.) and 0.5 part by mass of alumina | 0.4 | 1.8 | 1.6 | 7.3 | 90/10 | 35 | 5 | 1/7 | 0.6 | 2.8 | 12.4 | 1.8 | ○ |
| Ex. 3 | 8YSZ/8YSZ and 0.5 part by mass of alumina | 0.4 | 1.8 | 0.4 | 1.8 | 90/10 | 35 | 0.7 | 1/52 | 0.4 | 2.0 | 7.9 | 0.9 | ○ |
| Ex. 4 | 8YSZ/3YSZ and 0.5 part by mass of alumina | 0.4 | 1.8 | 0.5 | 2.1 | 90/10 | 35 | 5 | 1/7 | 0.5 | 1.9 | 7.9 | 0.9 | ○ |
| Ex. 5 | 10Sc1CeSZ/10Sc1CeSZ (provisionally calcined at 1,000° C.) and 0.3 part of alumina | 0.6 | 2.4 | 0.9 | 5.4 | 90/10 | 35 | 5 | 1/7 | 0.7 | 2.9 | 7.9 | 0.9 | ○ |
| Ex. 6 | Wet milled $La_{0.9}Sr_{0.1}Ga_{0.8}Mg_{0.2}O_3$/$La_{0.9}Sr_{0.1}Ga_{0.8}Mg_{0.2}O_3$ | 0.5 | 1.9 | 0.6 | 4.3 | 90/10 | 35 | 5 | 1/7 | 0.6 | 2.4 | 7.9 | 0.9 | ○ |
| Ex. 7 | Wet milled $(CeO_2)_{0.8}(SmO_{1.5})_{0.2}$/$(CeO_2)_{0.8}(SmO_{1.5})_{0.2}$ | 0.5 | 1.8 | 0.8 | 5.7 | 90/10 | 35 | 5 | 1/7 | 0.6 | 2.3 | 7.9 | 0.9 | ○ |
| Comp. Ex. 1 | 8YSZ/— and 0.5 part by weight of alumina | 0.4 | 1.8 | — | — | 100/0 | 40 | 0 | 0 | 0.5 | 1.9 | 0.38 | 0.17 | ◎ |
| Comp. Ex. 2 | 8YSZ/8YSZ (provisionally calcined at 1,000° C.) and 0.5 part by mass of alumina | 0.4 | 1.8 | 1.6 | 7.3 | 90/10 | 35 | 5 | 1/7 | 0.6 | 2.8 | 31 | 5.4 | x |
| Comp. Ex. 3 | 8YSZ/8YSZ (provisionally calcined at 1,000° C.) and 0.5 part by mass of alumina | 0.4 | 1.8 | 1.6 | 7.3 | 90/10 | 35 | 5 | 1/7 | 0.6 | 2.8 | 7.9 | 0.9 | ○ |
| Comp. Ex. 4 | 8YSZ/8YSZ (provisionally calcined at 1,250° C.) and 0.5 part by mass of alumina | 0.4 | 1.8 | 4.3 | 25.7 | 90/10 | 35 | 0.2 | 1/105 | 0.9 | 4.5 | 0.38 | 0.17 | ◎ |
| Comp. Ex. 5 | 8YSZ (provisionally calcined at 1,250° C.)/8YSZ and 0.5 parts by mass of alumina | 4.3 | 25.7 | 0.4 | 1.8 | 60/40 | 5 | 35 | 7/1 | 2.8 | 16.8 | 12.4 | 1.8 | ○ |

TABLE 2

| Symbol | Composition (A)/(B) | Surface peeled from the polymer film | | | Air surface | | | Rz ratio | Ra ratio | Bulk density/theoretical density (%) | Strength (MPa) |
|---|---|---|---|---|---|---|---|---|---|---|---|
| | | Rz μm | Ra μm | Rmax/Rz | Rz μm | Ra μm | Rmax/Ra | | | | |
| Ex. 1 | 8YSZ/8YSZ (provisionally calcined at 1,000° C.) and 0.5 part by mass of alumina | 6.9 | 0.79 | 1.2 | 4.7 | 0.55 | 1.2 | 1.5 | 1.4 | 97 | 30 |
| Ex. 2 | 8YSZ/8YSZ (provisionally calcined at 1,000° C.) and 0.5 part by mass of alumina | 10.7 | 1.1 | 1.3 | 4.6 | 0.55 | 1.2 | 2.3 | 2.0 | 98 | 30 |
| Ex. 3 | 8YSZ/8YSZ and 0.5 part by mass of alumina | 6.2 | 0.58 | 1.2 | 3.9 | 0.49 | 1.3 | 1.6 | 1.2 | 97 | 35 |
| Ex. 4 | 8YSZ/3YSZ and 0.5 part by mass of alumina | 5.9 | 0.55 | 1.1 | 4.1 | 0.52 | 1.1 | 1.4 | 1.1 | 98 | 40 |
| Ex. 5 | 10Sc1CeSZ/10SC1CeSZ (provisionally calcined at 1,000° C.) and 0.3 part by mass of alumina | 7.2 | 0.82 | 1.3 | 4.9 | 0.67 | 1.2 | 1.5 | 1.2 | 98 | 30 |

TABLE 2-continued

| | | Surface peeled from the polymer film | | | Air surface | | | | | Bulk density/ theoretical | |
|---|---|---|---|---|---|---|---|---|---|---|---|
| Symbol | Composition (A)/(B) | Rz μm | Ra μm | Rmax/Rz | Rz μm | Ra μm | Rmax/Ra | Rz ratio | Ra ratio | density (%) | Strength (MPa) |
| Ex. 6 | Wet milled $La_{0.9}Sr_{0.1}Ga_{0.8}Mg_{0.2}O_3$/ $La_{0.9}Sr_{0.1}Ga_{0.8}Mg_{0.2}O_3$ | 6.8 | 0.77 | 1.2 | 5.2 | 0.59 | 1.2 | 1.3 | 1.3 | 97 | 30 |
| Ex. 7 | Wet milled $(CeO_2)_{0.8}(SmO_{1.5})_{0.2}$/ $(CeO_2)_{0.8}(SmO_{1.5})_{0.2}$ | 7.1 | 0.83 | 1.1 | 5.8 | 0.63 | 1.2 | 1.2 | 1.3 | 97 | 30 |
| Comp. Ex. 1 | 8YSZ/- and 0.5 part by mass of alumina | 1.8 | 0.17 | 1.5 | 1.3 | 0.08 | 1.1 | 1.4 | 3.3 | 98 | 40 |
| Comp. Ex. 3 | 8YSZ/8YSZ (provisionally calcined at 1,000° C.) and 0.5 part by mass of alumina | 21.7 | 3.8 | 2.4 | 24.2 | 5.3 | 2.1 | 1.1 | 1.4 | 96 | 25 |
| Comp. Ex. 4 | 8YSZ/8YSZ (provisionally calcined at 1,250° C.) and 0.5 part by mass of alumina | 11.5 | 3.4 | 1.9 | 27.7 | 8.9 | 1.6 | 2.4 | 2.6 | 96 | 25 |
| Comp. Ex. 5 | 8YSZ (provisionally calcined at 1,250° C.)/8YSZ and 0.5 part by mass of alumina | 16.4 | 3.8 | 1.8 | 9.5 | 2.7 | 1.5 | 1.7 | 1.4 | 97 | 25 |

TABLE 3

| | | Maximum output density (W/cm$^2$) | | Increased ratio of maximum output density (%) | | | |
|---|---|---|---|---|---|---|---|
| Cell Production Examples | Electrolyte sheet used | Early stage | After lapse of 200 hours | Early stage | After lapse of 200 hours | Peeling of electrode | Remarks |
| Cell Production Example 1 | Ex. 1 | 0.38 | 0.33 | 15 | 32 | Not detected | |
| | Ex. 2 | 0.39 | 0.30 | 18 | 20 | Not detected | |
| | Ex. 3 | 0.37 | 0.32 | 12 | 28 | Not detected | |
| | Ex. 4 | 0.38 | 0.32 | 15 | 28 | Not detected | |
| | Comp. Ex. 1 | 0.33 | 0.25 | — | — | Observed, in part | |
| | Comp. Ex. 4 | 0.41 | 0.24 | 24 | −4 | Not detected | Cracks occurred |
| | Comp. Ex. 5 | 0.40 | 0.17 | 21 | −32 | Not detected | Cracks occurred |
| Cell Production Example 2 | Ex. 5 | 0.63 | 0.61 | 11 | 42 | Not detected | |
| | Comp. Ex. 6 | 0.57 | 0.43 | — | — | Observed, in part | Cracks occurred |
| Cell Production Example 3 | Ex. 6 | 0.68 | 0.59 | 39 | 97 | Not detected | |
| | Comp. Ex. 7 | 0.49 | 0.30 | — | — | Observed, in part | Cracks occurred |
| Cell Production Example 4 | Ex. 7 | 052 | 0.45 | 18 | 104.6 | Not detected | |
| | Comp. Ex. 8 | 0.44 | 0.22 | — | — | Observed, in part | Cracks occurred |

As can also be seen from Table 3, cells of Cell Production Examples 1 to 4, in which surface roughness on both surfaces of the electrolyte sheet meets the requirements defined in the present invention, had any power generation characteristics improved by 10% or more in current density, as compared to a cell formed of an electrolyte sheet with smooth surface roughness. They also had excellent adhesion of the electrodes, in which the electrodes were firmly attached after the electric power generation performance evaluation test. In contrast, the cell formed of an electrolyte sheet with smooth surface roughness exhibited peeling in part of the electrode layers. Further, when the electrolyte sheet had rougher surface roughness than the definition of the present invention, cracks occurred on the green sheet, three-point bending strength was decreased, and electric power generation performance was very poor, probably because of cracks occurred in part during the continuous electric power generation test for 200 hours.

INDUSTRIAL APPLICABILITY

The present invention is constituted as described above, and the specified surface roughness on both surfaces of a zirconia sheet makes it possible that even when electrodes are printed on both surfaces as is the case for solid electrolyte films, the electrodes are firmly attached to the zirconia sheet with high adhesion without causing a problem of local defects of electric power distribution due to uneven thicknesses of the electrode printed layers and that peeling in part during formation of the electrodes or peeling of the electrodes during operation is prevented as much as possible. In particular, when used for fuel cells, electric power generation characteristics and durability of the fuel cells can remarkably be improved.

The invention claimed is:

1. An electrolyte sheet for solid oxide fuel cells comprising a sintered ceramic sheet,
    wherein surface roughness of the sheet as measured by an optical and laser-based non-contact three-dimensional profile measuring system is 2.0 to 20 μm in Rz and 0.4 to 3.0 μm in Ra on both surfaces of the sheet, and
    wherein a ratio of Rz of one surface (having a greater Rz) to Rz of the other surface having a smaller Rz of the sheet (Rz ratio) is in a range of 1.0 to 3.0 and a ratio of Rmax to Rz (Rmax/Rz ratio) of at least one surface is in a range of 1.0 to 2.0, and
    wherein Rz (mean roughness depth), Ra (arithmetical mean roughness value), and Rmax (maximum roughness depth) are roughness parameters as determined according to German Standard "DIN-4768" and are numerical values as measured for each surface of the sheet.

2. An electrolyte sheet for solid oxide fuel cells comprising a sintered ceramic sheet,
wherein surface roughness of the sheet as measured by an optical and laser-based non-contact three-dimensional profile measuring system is 2.0 to 20 μm in Rz and 0.4 to 3.0 μm in Ra on both surfaces, and
wherein a ratio of Ra of one surface (having a greater Ra) to Ra of the other surface having a smaller Ra of the sheet (Ra ratio) is in a range of 1.0 to 3.0 and a ratio of Rmax to Rz (Rmax/Rz ratio) of at least one surface is in a range of 1.0 to 2.0, and
wherein Rz (mean roughness depth), Ra (arithmetical mean roughness value), and Rmax (maximum roughness depth) are roughness parameters as determined according to German Standard "DIN-4768" and are numerical values as measured for each surface of the sheet.

3. An electrolyte sheet for solid oxide fuel cells comprising a sintered ceramic sheet,
wherein surface roughness of the sheet as measured by an optical and laser-based non-contact three-dimensional profile measuring system is 2.0 to 20 μm in Rz and 0.4 to 3.0 μm in Ra, and
wherein a ratio of Rz of one surface (having a greater Rz and a greater Ra) to Rz of the other surface having a smaller Rz and a smaller Ra (Rz ratio) is in a range of 1.0 to 3.0, and a ratio of Ra of one surface (having a greater Rz and a greater Ra) to Ra of the other surface having a smaller Rz and a smaller Ra (Ra ratio) is in a range of 1.0 to 3.0, and a ratio of Rmax to Rz (Rmax/Rz ratio) of at least one surface is in a range of 1.0 to 2.0, and
wherein Rz (mean roughness depth), Ra (arithmetical mean roughness value), and Rmax (maximum roughness depth) are roughness parameters as determined according to German Standard "DIN-4768" and are numerical values as measured for each surface of the sheet.

4. The electrolyte sheet for solid oxide fuel cells according to claim 1, wherein the Rmax/Rz ratio is greater than 1.0 and not greater than 1.3.

5. A process for production of an electrolyte sheet for solid oxide fuel cells according to claim 1, comprising steps of: preparing a slurry for production of a green sheet, wherein particle size of solid components in the slurry is 0.2 to 0.8 μm in 50 vol. % diameter and 0.8 to 10 μm in 90 vol. % diameter, and wherein particle size distribution has each one peak in a range of 0.2 to 0.8 μm and in a range of 0.8 to 10 μm; preparing a green sheet, using the slurry, on a polymer film with surface roughness being in a range of 3 to 30 μm in Rz and in a range of 0.3 to 5 μm in Ra on a surface to be coated; and calcining the green sheet.

6. The production process according to claim 5, wherein the slurry for production of a green sheet is prepared by milling raw material powder (A) of 0.2 to 0.8 μm in 50 vol. % diameter and of 0.8 to 10 μm in 90 vol. % diameter, a binder, a dispersant, and a solvent, to give a slurry, to which is then added raw material powder (B) of 0.2 to 2 μm in 50 vol. % diameter and of 0.8 to 20 μm in 90 vol. % diameter at a ratio of 1% to 30% by mass, based on the total raw material powder mass, and by further milling the slurry so that a ratio ($T_B/T_A$) of a milling time ($T_B$) after addition of the raw material powder (B) to a milling time ($T_A$) only for the raw material powder (A) is adjusted in a range of 1/100 to 1/2.

7. The production process according to claim 5, wherein the green sheet is cut into a prescribed shape, and the cut green sheets are stacked up, while at least one selected from the group consisting of porous ceramic sheets, precursor green sheets of the porous ceramic sheets, and ceramic particles is placed as a spacer between the respective cut green sheets, which are then calcined.

8. The electrolyte sheet for solid oxide fuel cells according to claim 2, wherein the Rmax/Rz ratio is greater than 1.0 and not greater than 1.3.

9. The electrolyte sheet for solid oxide fuel cells according to claim 3, wherein the Rmax/Rz ratio is greater than 1.0 and not greater than 1.3.

10. A process for production of an electrolyte sheet for solid oxide fuel cells according to claim 2, comprising steps of: preparing a slurry for production of a green sheet, wherein particle size of solid components in the slurry is 0.2 to 0.8 μm in 50 vol. % diameter and 0.8 to 10 μm in 90 vol. % diameter, and wherein particle size distribution has each one peak in a range of 0.2 to 0.8 μm and in a range of 0.8 to 10 μm; preparing a green sheet, using the slurry, on a polymer film with surface roughness being in a range of 3 to 30 μm in Rz and in a range of 0.3 to 5 μm in Ra on a surface to be coated; and calcining the green sheet.

11. A process for production of an electrolyte sheet for solid oxide fuel cells according to claim 3, comprising steps of: preparing a slurry for production of a green sheet, wherein particle size of solid components in the slurry is 0.2 to 0.8 μm in 50 vol. % diameter and 0.8 to 10 μm in 90 vol. % diameter, and wherein particle size distribution has each one peak in a range of 0.2 to 0.8 μm and in a range of 0.8 to 10 μm; preparing a green sheet, using the slurry, on a polymer film with surface roughness being in a range of 3 to 30 μm in Rz and in a range of 0.3 to 5 μm in Ra on a surface to be coated; and calcining the green sheet.

12. A process for production of an electrolyte sheet for solid oxide fuel cells according to claim 4, comprising steps of: preparing a slurry for production of a green sheet, wherein particle size of solid components in the slurry is 0.2 to 0.8 μm in 50 vol. % diameter and 0.8 to 10 μm in 90 vol. % diameter, and wherein particle size distribution has each one peak in a range of 0.2 to 0.8 μm and in a range of 0.8 to 10 μm; preparing a green sheet, using the slurry, on a polymer film with surface roughness being in a range of 3 to 30 μm in Rz and in a range of 0.3 to 5 μm in Ra on a surface to be coated; and calcining the green sheet.

13. A process for production of an electrolyte sheet for solid oxide fuel cells according to claim 8, comprising steps of: preparing a slurry for production of a green sheet, wherein particle size of solid components in the slurry is 0.2 to 0.8 μm in 50 vol. % diameter and 0.8 to 10 μm in 90 vol. % diameter, and wherein particle size distribution has each one peak in a range of 0.2 to 0.8 μm and in a range of 0.8 to 10 μm; preparing a green sheet, using the slurry, on a polymer film with surface roughness being in a range of 3 to 30 μM in Rz and in a range of 0.3 to 5 μm in Ra on a surface to be coated; and calcining the green sheet.

14. A process for production of an electrolyte sheet for solid oxide fuel cells according to claim 9, comprising steps of: preparing a slurry for production of a green sheet, wherein particle size of solid components in the slurry is 0.2 to 0.8 μm in 50 vol. % diameter and 0.8 to 10 μm in 90 vol. % diameter, and wherein particle size distribution has each one peak in a range of 0.2 to 0.8 μm and in a range of 0.8 to 10 μm; preparing a green sheet, using the slurry, on a polymer film with surface roughness being in a range of 3 to 30 μm in Rz and in a range of 0.3 to 5 μm in Ra on a surface to be coated; and calcining the green sheet.

15. The production process according to claim 10, wherein the slurry for production of a green sheet is prepared by milling raw material powder (A) of 0.2 to 0.8 μm in 50 vol. % diameter and of 0.8 to 10 μm in 90 vol. % diameter, a binder, a dispersant, and a solvent, to give a slurry, to which is then added raw material powder (B) of 0.2 to 2 μm in 50 vol. % diameter and of 0.8 to 20 μm in 90 vol. % diameter at a ratio of 1% to 30% by mass, based on the total raw material powder mass, and by further milling the slurry so that a ratio ($T_B/T_A$) of a milling time ($T_B$) after addition of the raw material powder (B) to a milling time ($T_A$) only for the raw material powder (A) is adjusted in a range of 1/100 to 1/2.

16. The production process according to claim 11, wherein the slurry for production of a green sheet is prepared by milling raw material powder (A) of 0.2 to 0.8 μm in 50 vol. % diameter and of 0.8 to 10 μm in 90 vol. % diameter, a binder, a dispersant, and a solvent, to give a slurry, to which is then added raw material powder (B) of 0.2 to 2 μm in 50 vol. % diameter and of 0.8 to 20 μm in 90 vol. % diameter at a ratio of 1% to 30% by mass, based on the total raw material powder mass, and by further milling the slurry so that a ratio ($T_B/T_A$) of a milling time ($T_B$) after addition of the raw material powder (B) to a milling time ($T_A$) only for the raw material powder (A) is adjusted in a range of 1/100 to 1/2.

17. The production process according to claim 12, wherein the slurry for production of a green sheet is prepared by milling raw material powder (A) of 0.2 to 0.8 μm in 50 vol. % diameter and of 0.8 to 10 μm in 90 vol. % diameter, a binder, a dispersant, and a solvent, to give a slurry, to which is then added raw material powder (B) of 0.2 to 2 μm in 50 vol. % diameter and of 0.8 to 20 μm in 90 vol. % diameter at a ratio of 1% to 30% by mass, based on the total raw material powder mass, and by further milling the slurry so that a ratio ($T_B/T_A$) of a milling time ($T_B$) after addition of the raw material powder (B) to a milling time ($T_A$) only for the raw material powder (A) is adjusted in a range of 1/100 to 1/2.

18. The production process according to claim 13, wherein the slurry for production of a green sheet is prepared by milling raw material powder (A) of 0.2 to 0.8 μm in 50 vol. % diameter and of 0.8 to 10 μm in 90 vol. % diameter, a binder, a dispersant, and a solvent, to give a slurry, to which is then added raw material powder (B) of 0.2 to 2 μm in 50 vol. % diameter and of 0.8 to 20 μm in 90 vol. % diameter at a ratio of 1% to 30% by mass, based on the total raw material powder mass, and by further milling the slurry so that a ratio ($T_B/T_A$) of a milling time ($T_B$) after addition of the raw material powder (B) to a milling time ($T_A$) only for the raw material powder (A) is adjusted in a range of 1/100 to 1/2.

19. The production process according to claim 14, wherein the slurry for production of a green sheet is prepared by milling raw material powder (A) of 0.2 to 0.8 μm in 50 vol. % diameter and of 0.8 to 10 μm in 90 vol. % diameter, a binder, a dispersant, and a solvent, to give a slurry, to which is then added raw material powder (B) of 0.2 to 2 μm in 50 vol. % diameter and of 0.8 to 20 μm in 90 vol. % diameter at a ratio of 1% to 30% by mass, based on the total raw material powder mass, and by further milling the slurry so that a ratio ($T_B/T_A$) of a milling time ($T_B$) after addition of the raw material powder (B) to a milling time ($T_A$) only for the raw material powder (A) is adjusted in a range of 1/100 to 1/2.

20. The production process according to claim 6, wherein the green sheet is cut into a prescribed shape, and the cut green sheets are stacked up, while at least one selected from the group consisting of porous ceramic sheets, precursor green sheets of the porous ceramic sheets, and ceramic particles is placed as a spacer between the respective cut green sheets, which are then calcined.

21. The electrolyte sheet for solid oxide fuel cells according to claim 1, wherein the sintered ceramic sheet is a sintered zirconia oxide sheet.

22. The electrolyte sheet for solid oxide fuel cells according to claim 2, wherein the sintered ceramic sheet is a sintered zirconia oxide sheet.

23. The electrolyte sheet for solid oxide fuel cells according to claim 3, wherein the sintered ceramic sheet is a sintered zirconia oxide sheet.

* * * * *